(12) United States Patent
Hibi

(10) Patent No.: US 7,907,304 B2
(45) Date of Patent: Mar. 15, 2011

(54) IMAGE RECORDING APPARATUS, IMAGE RECORDING METHOD AND PROGRAM THEREFOR

(75) Inventor: Makoto Hibi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/446,115

(22) Filed: Jun. 5, 2006

(65) Prior Publication Data

US 2006/0274963 A1 Dec. 7, 2006

(30) Foreign Application Priority Data

Jun. 7, 2005 (JP) .................................. 2005-167252

(51) Int. Cl.
*G06K 15/00* (2006.01)
*G06K 9/32* (2006.01)
*G06F 3/12* (2006.01)

(52) U.S. Cl. ...................... 358/1.18; 358/1.14; 358/1.16; 358/1.17; 382/175

(58) Field of Classification Search ................... 358/1.9, 358/3.26, 3.27, 1.18, 296, 448, 518, 523, 358/537, 538, 1.14, 1.16, 1.17; 382/117, 382/118, 163, 167, 175, 275
See application file for complete search history.

(56) References Cited

U.S. PATENT DOCUMENTS

| | | | |
|---|---|---|---|
| 7,548,647 B2 * | 6/2009 | Whitman | 382/167 |
| 2004/0189807 A1 * | 9/2004 | Smith | 348/207.1 |
| 2005/0009564 A1 * | 1/2005 | Hayaashi et al. | 455/558 |
| 2006/0103887 A1 * | 5/2006 | Enomoto et al. | 358/296 |
| 2006/0132856 A1 * | 6/2006 | Enomoto et al. | 358/448 |

FOREIGN PATENT DOCUMENTS

| | | |
|---|---|---|
| JP | 9-44691 | 2/1997 |
| JP | 9-322192 | 12/1997 |

* cited by examiner

*Primary Examiner* — James A Thompson
(74) *Attorney, Agent, or Firm* — Fitzpatrick, Cella, Harper & Scinto

(57) ABSTRACT

An image recording apparatus, method, and program corrects a red-eye portion of an image without requiring a coordinate input apparatus, properly corrects a red-eye portion of the image present at a position designated by a user, and detects a red-eye portion of the image, without utilizing a fluorescent ink. The apparatus detects a correction candidate position in a digital image designated by the user by a predetermined method, extracts a contour from the designated digital image, prepares a monochromatic schematic image based on the extracted contour, prepares a marked schematic image by synthesizing an indicator mark, indicates a correction candidate position, in the correction candidate position detected by correction candidate position detecting device, and prepares a mark sheet by printing the marked schematic image and mark sheet data.

13 Claims, 2 Drawing Sheets

FIG. 2

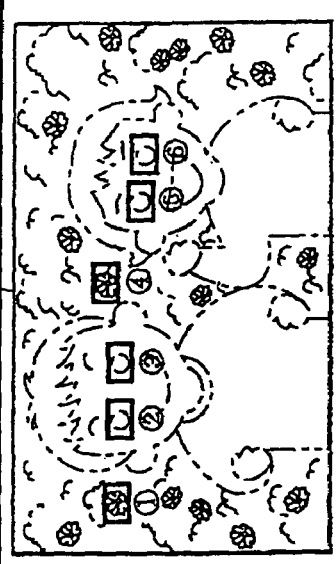
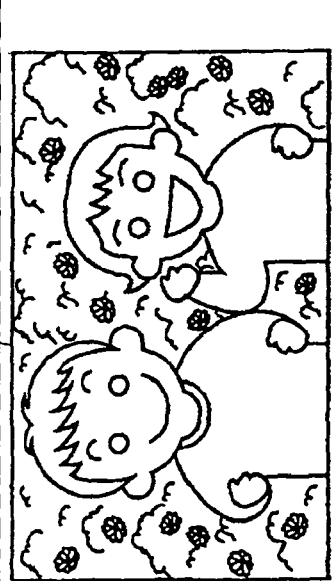

| 1. DESIGNATE RED-EYED PLACE(S) TO BE CORRECTED | SELECT RED-EYED PLACE(S) TO BE CORRECTED ON ABOVE IMAGES (BLACK OUT BOX "○" BY DEEP BLACK PENCIL, etc.) | | | | |
|---|---|---|---|---|---|
| SELECT ONE OR MORE FROM THE RIGHT ITEMS | CORRECT① ○ | CORRECT② ○ | CORRECT③ ○ | CORRECT④ ○ | CORRECT⑤ ○ |
| | CORRECT⑥ ○ | CORRECT⑦ ○ | CORRECT⑧ ○ | CORRECT⑨ ○ | CORRECT⑩ ○ |
| | CORRECT⑪ ○ | CORRECT⑫ ○ | CORRECT⑬ ○ | CORRECT⑭ ○ | CORRECT⑮ ○ |
| | CORRECT⑯ ○ | CORRECT⑰ ○ | CORRECT⑱ ○ | CORRECT⑲ ○ | CORRECT⑳ ○ |
| 2. PRINT IMAGE(S) | 1: INSERT PRINTING PAPERS TO SHEET TRAY<br>2: SET MARKED SHEET ON ORIGINAL PLATE<br>3: DEPRESS KEYS IN THE FOLLOWING ORDER (PHOTONAVI SHEET → ▲ → OK) | | | | |

IMAGE RECORDING APPARATUS, IMAGE RECORDING METHOD AND PROGRAM THEREFOR

BACKGROUND OF THE INVENTION

1. Field of the Invention

The present invention relates to a digital image processing apparatus and an image recording apparatus equipped with such digital image processing apparatus, and more particularly to a digital image processing apparatus which is connectable with a storage medium storing a digital image captured by a digital camera and which can read out the digital image from the connected storage medium and can directly print the digital image.

The present invention also relates to an image recording apparatus which includes indication means to be used for uniquely designating a digital image recorded in a storage medium, which is capable of detecting a portion of a digital image considered to show a red-eye phenomenon within the digital image and which includes means that is capable of correcting, among candidates of the red-eye phenomenon, those only in positions designated by a user.

2. Related Background Art

There is already known a multi-function printer, integrating a scanner which reads an original image by a contact image sensor (CIS) and outputs a digital image to a personal computer, and a printer for recording, on a recording sheet, the digital image from the personal computer.

In such a multi-function printer, the scanner and the printer are integrated within a single casing, and the scanner and the printer are driven by a drive source formed by a single motor (for example, a stepping motor). Such multi-function printer has a copying function and an image scanning function, and, in such copying function, a drive system of the printer is activated simultaneously with the original reading operation.

For example in the copying operation, the contact image sensor of the scanner is driven by the drive source to read an image, and, after the image reading operation, the read image is internally converted into printable data, based on which a printer engine executes an image printing operation.

Also in recent years, digital cameras, capable of converting a captured image into a digital image and storing the thus converted digital image in a storage medium such as Compact Flash (registered trade name) card, have become popular, and there has been conceived a card-direct printing apparatus which integrates a digital image processing apparatus and a printer, and in which the Compact Flash card or the like can be mounted directly, without utilizing a personal computer, for the purpose of printing the digital image with a simple operation and in which a process for printing the digital image is activated when a power supply is turned on.

There has further been conceived a multi-function printer, which integrates the functions of the card-direct printing apparatus described above and the functions of the aforementioned multi-function printer within a single casing.

Incidentally, in the image capture with the digital camera, particularly in the case of capturing an image of a person with a flashlight in a dark environment, there is often observed a so-called red-eye phenomenon in which the pupils of eyes of the person appear in red color. Such a red-eye phenomenon is induced by the fact that the pupils of the eyes are opened because of the dark environment, whereby the flash light reaches, through the pupils, the retinas and is reflected therefrom to reach the camera. Such a red-eye phenomenon is facilitated by the fact that digital cameras are made smaller for portability, whereby the optical axis of the image capturing lens and that of the flashlight are positioned mutually close.

There has been conceived an apparatus capable, in response to a designation by the user of area(s) containing an eye or both eyes in an image involving the red-eye phenomenon, of automatically identifying the number and the positions of red-eyes in the area, and of correcting such red-eyes (for example cf. patent reference 1: Japanese Patent Application Laid-open No. 09-322192).

Also conceived has been an apparatus including input means to be used for designating the positions of red-eyes to be corrected, by utilizing a fluorescent ink on a photographic print (for example cf. patent reference 2: Japanese Patent Application Laid-open No. 09-044691).

However, the prior technology proposed in the patent reference 1 involves a limitation that the user has to utilize a coordinate input apparatus in designating an arbitrary position, and a limitation that a red-eye, present in the position designated by the user, may not be properly detected and corrected, though depending on the red-eye detecting algorithm.

For example, as an extreme case, there may result in a defect in such a situation where the user designates an area not containing red-eyes.

Also the prior technology proposed in the patent reference 2 involves a difficulty in detecting a portion marked with the fluorescent ink, and a limitation of resulting in a defect in a situation where the user designates an arbitrary position.

SUMMARY OF THE INVENTION

An object of the present invention is to provide an image recording apparatus, an image recording method and a program therefor, capable of correcting a red-eye area without requiring a coordinate input apparatus, also capable of exactly correcting a red-eye portion presented in a position designated by the user, and capable of detecting a red-eye position without utilizing a fluorescent ink.

BRIEF DESCRIPTION OF THE DRAWINGS

FIG. 2 is a view showing a mark sheet 50 to be used in the embodiment 1.

DETAILED DESCRIPTION OF THE PREFERRED EMBODIMENTS

Figure 1:
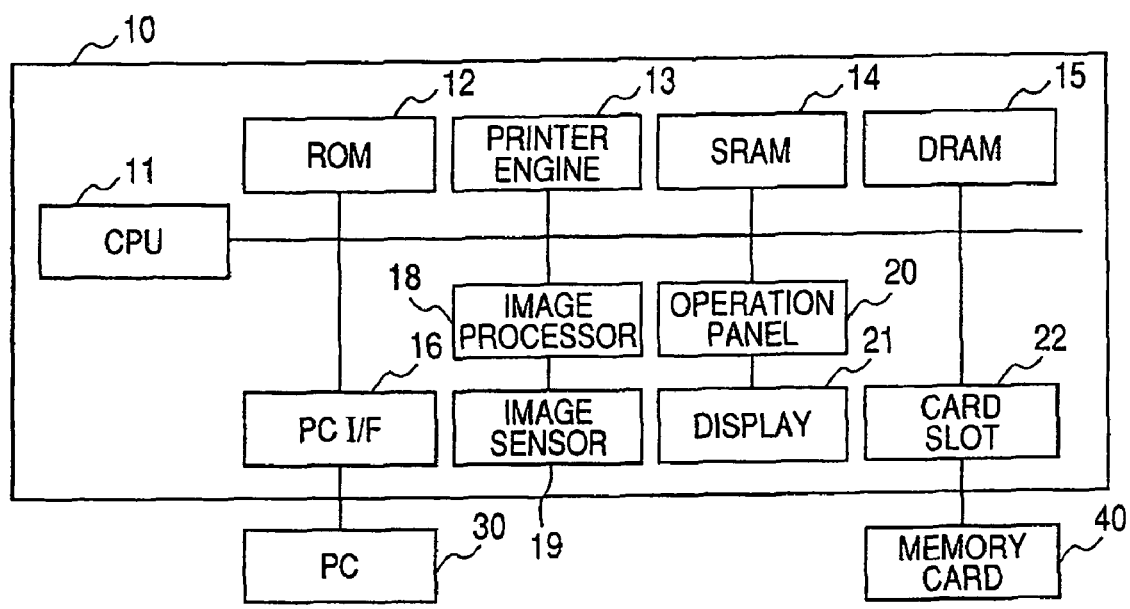
FIG. 1 is a block diagram of an MFP (multi-function peripheral) apparatus constituting an embodiment 1 of the present invention.

An embodiment of the present invention will be explained as a best mode for executing the invention.

Embodiment 1

FIG. 1 is a block diagram of an MFP (multi-function peripheral) apparatus 10 constituting the embodiment 1 of the present invention.

The MFP apparatus 10 constitutes an example of an image recording apparatus having a scanning function, a printing function, and a card-direct printing function, and an example of an image recording apparatus capable of reading a digital image, from a storage medium storing the digital image captured by a digital camera, and directly outputting the digital image on a recording sheet. The MFP apparatus 10 is provided with a CPU 11, a ROM 12, a printer engine 13, an SRAM 14, a DRAM 15, a PC I/F 16, an image processor 18, an image sensor 19, an operation panel 20, a display 21 and a card slot 22.

The CPU 11, constituting a system controller of the MFP apparatus 10, controls the entire MFP apparatus 10 and executes various operations thereof based on a control program stored in the ROM 12.

The ROM 12 stores a system control program of the MFP apparatus 10. However, the control program for the CPU 11 is not limited to that stored in the ROM 12 but may also be stored in an external memory medium, such as a floppy disk (registered trade name) or a CD-ROM and may be fetched by an exclusive reading apparatus into a RAM (for example SRAM 14) of the MFP apparatus 10 and executed by the CPU 11.

The printer engine 13 prints an input digital image on a predetermined recording sheet.

The SRAM 14 is principally used for storing registered data and the like of the MFP apparatus 10, and the DRAM 15 is principally used for storing the image data.

The PC I/F 16 is an interface connecting the MFP apparatus 10 and a personal computer 30. The personal computer 30 functions as a host computer through which changes in various set data in the MFP apparatus 10 and the starting of various operation can be commanded.

The image processor 18 applies various image processing operations on image data entered from the image sensor 19. The image sensor 19 constitutes a so-called scanner unit, and is formed by image reading means, such as a contact image sensor for reading an image on an original.

The operation panel 20 includes a display 21 for indicating an operation status of the MFP apparatus 10, and is used for entering instructions for operations by the user, for registering various data, and for confirming the operation status of the MFP apparatus 10 through the display 21.

The card slot 22 is an interface for connecting a memory card 40. In a state where the memory card 40 is connected, the user can select, utilizing the operation panel 20 and the display 21, an arbitrary image among the digital images stored within the memory card 40.

The digital image selected by the user is analyzed by the CPU 11, and is printed by the printer engine 13. In this operation, the DRAM 15 is utilized as a printing buffer. Also all the digital images mentioned above may be fetched into the DRAM 15, in order to increase the printing speed.

FIG. 2 shows a mark sheet 50 to be utilized in the embodiment 1.

The mark sheet 50 is provided with a digital image presentation area 51, a marked schematic image presentation area 52, and a mark sheet data inscription area 53.

The digital image presentation area 51 is an area for presenting a digital image (original image) to be printed. The marked schematic image presentation area 52 is an area for showing a red-eye position (a position detected as a red-eye candidate), detected from the digital image (original image), by an indicator mark, such as a rectangular line frame. The mark sheet data inscription area 53 is used for inscription by the user, in order to specify a position where a predetermined correction is to be executed.

In the embodiment 1, at first, a digital image to be subjected to a red-eye correction is selected by the user. In such a digital image designated by the user, a candidate position for correction is detected by a predetermined method, and such candidate position for correction is memorized in a memory apparatus. Then contours are extracted from the selected digital image, and a monochromatic schematic image is created from the thus extracted contours and stored in the memory apparatus. Then, in the detected candidate position for correction, a predetermined indicator mark, indicating a candidate position for correction, is synthesized and stored in the memory apparatus to obtain a marked schematic image.

Then a mark sheet 50 is printed for specifying the position of red-eye correction. The user inscribes marks in desired positions of the thus printed mark sheet, and the thus inscribed mark sheet 50 is read by the scanner unit (image sensor 19), and then a red-eye correction is executed on the image in positions corresponding to the marks inscribed by the user, and then the digital image designated by the user is printed. An image after red-eye correction can be printed through these procedures.

In the following, there will be explained operations to be executed by the user, in order to print the mark sheet 50.

[Operation 1]: The user selects a "red-eye correction mode" among various print modes shown on the display 21, utilizing left-right keys on the operation panel 20.

[Operation 2]: In response to the selection of "red-eye correction mode" in the operation 1, the display 21 displays a message for requesting an image selection operation. As the embodiment 1 utilizes a display device capable of displaying text data of two lines only, DCF numbers commonly employed in digital cameras are shown on the display 21, and the user can select an arbitrary image number utilizing the left-right keys on the operation panel 20.

[Operation 3]: The user selects an arbitrary image number and depresses an OK key on the operation panel 20.

[Operation 4]: A mark sheet 50 as shown in FIG. 2 is printed, then the display 21 displays a message "set the sheet and depress OK key", and the apparatus enters a stand-by state awaiting the depression of the OK key. The mark sheet 50 shown in FIG. 2 is printed by the [operation 1] through [operation 4] described above.

The mark sheet 50 includes, in an upper left area thereof, a digital image presentation area 51, in an upper right area, a marked schematic image presentation area 52 with a rectangular frame indicator mark indicating a detected red-eye position, and, under these two areas 51, 52, a mark sheet data inscription area 53 in which marks are to be inscribed (blackout) by the user.

The digital image presentation area 51 prints a digital image (original image) as recorded in the memory card 40 and not subjected to a red-eye correction in the MFP apparatus 10.

In the marked schematic image presentation area 52, an image is printed in which a position where the MFP apparatus 10 detects a red-eye by a predetermined method (for example by extracting a position where a red signal component alone is present) is indicated by a red rectangular frame (indicator mark), and a such red rectangular frame is synthesized with the digital image. As the original digital image may contain all the colors, the red rectangular frame may become not easily recognizable. In order to avoid such situation, the image with which the rectangular indicator mark showing the red-eye candidate is to be synthesized (namely the image printed in the marked schematic image presentation area 52) is a schematic image (or rough sketch) formed by intentionally removing the color components from the digital image. Stated differently, the original image is converted to monochromatic data, and the rectangular indicator frame indicating the red-eye candidate is synthesized on such monochromatic data.

The red-eye detection in the embodiment 1 utilizes an algorithm that only requires limited capacities in the ROM 12 and the DRAM 15. For this reason, a non-red-eye area may be erroneously detected as a red-eye. Nevertheless, the digital image and the image synthesized with the detected red-eye candidate are printed side by side, so that the user can easily confirm the areas where the red-eye is correctly detected. It is however also possible not to print the original digital image but to print the marked schematic image only.

The mark sheet data inscription area 53 prints a marking column, in which the user blacks out marks of numbers for which the user desires correction, based on the rectangular indicator frame of the red-eye candidate printed in the marked schematic image presentation area 52.

When the scanner unit (image sensor 19) reads the mark sheet 50 in which arbitrary red-eye positions are marked, the image processor 18 detects the black-out mark positions, based on the marks in the mark sheet data inscription area 53, and executes the correction on the corresponding red-eye areas only.

The mark sheet 50 is constituted of the digital image presentation area 51 for presenting the digital image to be printed, the marked schematic image presentation area 52 for presenting a marked schematic image showing the detected red-eye candidate position, and the mark sheet data inscription area 53 for mark inscription by the user, but it is also possible to print an image after red-eye correction on all the detected red-eye candidates, together with the digital image (original image), whereby the user can compare the results of printing before and after the correction.

In the embodiment 1, red-eye candidates are automatically detected and the positions of correction desired by the user are inscribed in the mark sheet, and such embodiment is applicable, not only in the case of executing the red-eye correction in a simplified manner, but also to a case where the detection can be made by the apparatus only but the positions of correction have to be designated by the user as the error rate in such detection cannot inherently be made zero.

Also as the correction process mentioned above, a cosmetic skin color correction on the image may be executed instead of the red-eye correction. In the case of such a cosmetic skin color correction, the detection means for detecting the candidate positions of correction in a designated digital image by a predetermined method detects a mole, a speckle, a freckle, a macula and the like, black or brown color components are detected and the thus detected portion is indicated as a candidate position for correction.

In the embodiment 1, the relative positions of constituents, indicated images and the like are not to be construed as limiting the present invention, unless specified otherwise.

Also the operation panel 20 constitutes an example of image designating means, by which the user designates a desired digital image.

Also the CPU 11, the ROM 12 and the image processor 18 constitute an example of correction candidate position detecting means which detects a candidate position for correction in the designated digital image by a predetermined method; the CPU 11, the ROM 12 and the image processor 18 also constitute an example of schematic image generating means which extracts a contour from the designated digital image and generates a monochromatic schematic image based on the thus extracted contour; the CPU 11, the ROM 12 and the image processor 18 further constitute an example of marked schematic image generating means which prepares a marked schematic image by synthesizing a predetermined indicator mark, indicating a correction candidate position, in a predetermined correction candidate position detected by the correction candidate position detecting means, thereby forming a marked schematic image; and the CPU 11, the ROM 12 and the image processor 18 also constitute an example of mark sheet preparing means which prints the marked schematic image and the mark sheet data, thereby preparing the mark sheet.

The image sensor 19 constitutes an example of image reading means which reads the prepared mark sheet.

The CPU 11, the ROM 12, the image sensor 19 and the image processor 18 constitute an example of mark detection means which detects a black-out mark in a predetermined position, based on the thus read image; and also constitute an example of correction execution means which executes a predetermined correction process in the position of thus detected mark only.

The printer engine 13 constitutes an example of printing means which prints the digital image designated by the user, based on the correction process executed by the correction executing means.

As regards the aforementioned indicator mark, the rectangular frame may be replaced for example by at least one of a hatched area, a cross-shaped mark, a circle-shaped mark, a rectangle-shaped mark, and a triangle-shaped mark.

Also the aforementioned embodiment may also be construed as an invention of a program. More specifically, the foregoing embodiment constitutes an example of a program for reading a digital image from a storage medium storing the digital image captured by a digital camera, and directly outputting the digital image to a recording medium, the program including a correction candidate position detecting step of detecting a correction candidate position by a predetermined method in the digital image designated by the user and storing such a correction candidate position in a memory apparatus, a schematic image generating step of extracting a contour from the designated digital image, then generating a monochromatic schematic image based on the thus extracted contour and storing such schematic image in a memory apparatus, a marked schematic image preparing step of synthesizing a predetermined indicator mark, indicating a correction candidate position, in the correction candidate position detected in the correction candidate position detecting step, and storing the marked schematic image in the memory apparatus, and a mark sheet preparing step of printing the marked schematic image and the predetermined mark sheet data, thereby creating a mark sheet.

The present invention provides the effects of allowing the correction of a red-eye portion without requiring a coordinate input apparatus, allowing the proper correction of a red-eye portion present in a position designated by the user, and also allowing the detection of a red-eye, without utilizing a fluorescent ink.

This application claims priority from Japanese Patent Application No. 2005-167252 filed Jun. 7, 2005, which is hereby incorporated by reference herein.

The invention claimed is:

1. An image processing apparatus, comprising:
 a detecting unit configured to detect a correction candidate area in an image;
 a print control unit configured to cause a printing apparatus to print, on a sheet, an image not subjected to a predetermined correction process and information indicating at least one correction candidate area in the image detected by said detecting unit, the sheet permitting a user to select at least one area on which the predetermined correction process is to be performed from the at least one correction candidate area by adding onto the sheet, by a user, information for specifying the at least one area from the at least one correction candidate area;
 an acquiring unit configured to acquire a read image obtained by reading, with a reading apparatus, of the sheet caused to be printed by said print control unit and acquire, based on the read image, the information for specifying the at least one area from the at least one correction candidate area added by the user onto the sheet caused to be printed by said print control unit;

a determining unit configured to determine the at least one area in the image selected by the user, based on the information for specifying the at least one area from the at least one correction candidate area added by the user onto the sheet and acquired by said acquiring unit; and an executing unit configured to execute the predetermined correction process on the at least one area in the image determined by said determining unit.

2. An image processing apparatus according to claim 1, further comprising:

a second print control unit configured to cause the printing apparatus to print the image, based on a result of the predetermined correction process executed by said executing unit.

3. An image processing apparatus according to claim 1, wherein the predetermined correction process is a red-eye correction process or a cosmetic skin color correction process.

4. An image processing apparatus according to claim 1, further comprising:

a preparation unit configured to prepare a schematic image from the image based on a contour extraction of the image, wherein said print control unit causes the printing apparatus to print the schematic image prepared by the preparation unit on the sheet.

5. An image processing apparatus according to claim 4, wherein the schematic image includes an indicator mark indicating the at least one correction candidate area in the image detected by said detecting unit.

6. An image processing apparatus according to claim 1, wherein said print control unit causes the printing apparatus to print both the image not subjected to the predetermined correction process and an image in which the at least one correction candidate area has been subjected to the predetermined correction process.

7. An image processing method, comprising:

detecting a correction candidate area in an image;

causing a printing apparatus to print, on a sheet, an image not subjected to a predetermined correction process and information indicating at least one detected correction candidate area in the image, the sheet permitting a user to select at least one area on which the predetermined correction process is to be performed from the at least one correction candidate area, by adding onto the sheet, by a user, information for specifying the at least one area from the at least one correction candidate area;

acquiring a read image obtained by reading, with a reading apparatus, of the printed sheet, and acquiring, based on the read image, the information for specifying the at least one area from the at least one correction candidate area added by the user onto the sheet caused to be printed by said causing step;

determining the at least one area in the image selected by a user, based on the acquired information for specifying the at least one area from the at least one correction candidate area added by the user onto the sheet; and executing the predetermined correction process on the determined at least one area in the image.

8. An image processing method according to claim 7, further comprising:

causing the printing apparatus to print the image, based on a result of the predetermined correction process.

9. An image processing method according to claim 7, wherein the predetermined correction process is a red-eye correction process or a cosmetic skin color correction process.

10. An image processing method according to claim 7, further comprising:

preparing a schematic image from the image based on a contour extraction of the image, wherein the prepared schematic image is printed on the sheet by the printing apparatus.

11. An image processing method according to claim 7, wherein the image comprises a schematic image that includes an indicator mark indicating the at least one detected correction candidate area in the image.

12. An image processing method according to claim 7, wherein said causing step causes the printing apparatus to print both the image not subjected to the predetermined correction process and an image in which the at least one correction candidate area has been subjected to the predetermined correction process.

13. A computer program embodied on a computer-readable medium for instructing a computer to control an image processing apparatus according to a method comprising:

detecting a correction candidate area in an image;

causing a printing apparatus to print, on a sheet, an image not subjected to a predetermined correction process and information indicating at least one detected correction candidate area in the image, the sheet permitting a user to select at least one area on which a predetermined correction process is to be performed from the at least one correction candidate area, by adding onto the sheet, by a user, information for specifying the at least one area from the at least one correction candidate area;

acquiring a read image obtained by reading, with a reading apparatus, of the printed sheet, and acquiring, based on the read image, the information for specifying the at least one area from the at least one correction candidate area added by the user onto the sheet caused to be printed by the causing step;

determining the at least one area in the image selected by a user, based on the acquired information for specifying the at least one area from the at least one correction candidate area added by the user onto the sheet; and executing the predetermined correction process on the determined at least one area in the image.

* * * * *